United States Patent
Dorovsky et al.

(10) Patent No.: US 9,557,440 B2
(45) Date of Patent: *Jan. 31, 2017

(54) RADIAL WAVES IN A BOREHOLE AND STONELEY WAVES FOR MEASURING FORMATION PERMEABILITY AND ELECTROACOUSTIC CONSTANT

(75) Inventors: Vitaly Nikolaevich Dorovsky, Novosibirsk (RU); Alexander Igorevich Fedorov, Novosibirskaya oblast (RU); Yury Vadimovich Perepechko, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/936,757

(22) PCT Filed: Jul. 17, 2009

(86) PCT No.: PCT/RU2009/000356
§ 371 (c)(1),
(2), (4) Date: Oct. 7, 2010

(87) PCT Pub. No.: WO2011/008123
PCT Pub. Date: Jan. 20, 2011

(65) Prior Publication Data
US 2012/0095688 A1    Apr. 19, 2012

(51) Int. Cl.
*G01V 1/40* (2006.01)
*G01V 3/18* (2006.01)
*G01V 5/04* (2006.01)
*G01V 9/00* (2006.01)
*G01N 15/08* (2006.01)
(Continued)

(52) U.S. Cl.
CPC ............ *G01V 11/007* (2013.01); *E21B 49/008* (2013.01); *G01V 2210/6163* (2013.01)

(58) Field of Classification Search
CPC ......... G01V 11/007; G01V 11/00; G01V 1/50; G01V 1/30; G01V 1/48; G01V 49/00; E21B 49/008; G01N 15/0826
USPC ...................................................... 702/11, 12
See application file for complete search history.

(56) References Cited

U.S. PATENT DOCUMENTS 2,814,017 A    11/1957 Doll
4,752,918 A *  6/1988 Boucher et al. .............. 367/158
4,926,692 A *  5/1990 Brokowski et al. ............ 73/597
(Continued)

FOREIGN PATENT DOCUMENTS

EP    1577683 A1    9/2005

OTHER PUBLICATIONS

Rosenbaum, J.H., "Synthetic Microseismograms: Logging in Porous Formations," Geophysics, vol. 39, No. 1, pp. 14-32 (Feb. 1974).

(Continued)

*Primary Examiner* — Michael Nghiem
(74) *Attorney, Agent, or Firm* — Mossman Kumar & Tyler PC

(57) ABSTRACT

A Stoneley wave is generated in a borehole in a saturated porous earth formation. Measurements are made of the velocity of motion of the formation and the fluid in the formation. The difference in the velocities is indicative of formation permeability. An additional measurement of the electric field at the borehole wall enables determination of the electroacoustic constant.

16 Claims, 5 Drawing Sheets

(51) Int. Cl.
*G01V 11/00* (2006.01)
*E21B 49/00* (2006.01)

(56) References Cited

U.S. PATENT DOCUMENTS

| | | | |
|---|---|---|---|
| 5,689,068 A | 11/1997 | Locatelli et al. | |
| 5,784,333 A | 7/1998 | Tang et al. | |
| 6,795,373 B1* | 9/2004 | Aronstam | 367/85 |
| 8,055,448 B2* | 11/2011 | Mathiszik et al. | 702/11 |
| 2003/0087296 A1* | 5/2003 | Fujita et al. | 435/6 |
| 2004/0112594 A1* | 6/2004 | Aronstam et al. | 166/249 |
| 2006/0293857 A1* | 12/2006 | Moos et al. | 702/12 |
| 2007/0150200 A1* | 6/2007 | Charara et al. | 702/6 |
| 2007/0235184 A1* | 10/2007 | Thompson et al. | 166/250.01 |
| 2008/0125974 A1* | 5/2008 | Dubinsky et al. | 702/11 |
| 2008/0253230 A1* | 10/2008 | Thompson et al. | 367/129 |
| 2009/0005995 A1* | 1/2009 | Tang et al. | 702/11 |
| 2009/0180350 A1* | 7/2009 | Dorovsky et al. | 367/35 |
| 2010/0254218 A1* | 10/2010 | Dorovsky et al. | 367/38 |
| 2011/0050234 A1* | 3/2011 | Dorovsky | 324/346 |
| 2012/0041680 A1* | 2/2012 | Dorovsky et al. | 702/12 |
| 2012/0224455 A1* | 9/2012 | Dorovsky et al. | 367/35 |

OTHER PUBLICATIONS

Butler, Karl E., et al., "Measurement of the seismoelectric response from a shallow boundary," Geophysics, vol. 61, No. 5, pp. 1769-1778 (Sep.-Oct. 1996).

Mikhailov, Oleg V., et al., "Electroseismic Investigation of the Shallow Subsurface: Field Measurements and Numerical Modeling," Geophysics, 62(1), 97-105 (1997).

Smeulders, D.M.J. Prof., et al., "Coupled seismic and electromagnetic wave propagation," funded as a Shell-FOAM (Fundamental Research on Matter), Printed in Netherlands (2011).

International Preliminary Report on Patentability, PCT/RU2009/000356 (Jan. 26, 2012).

\* cited by examiner

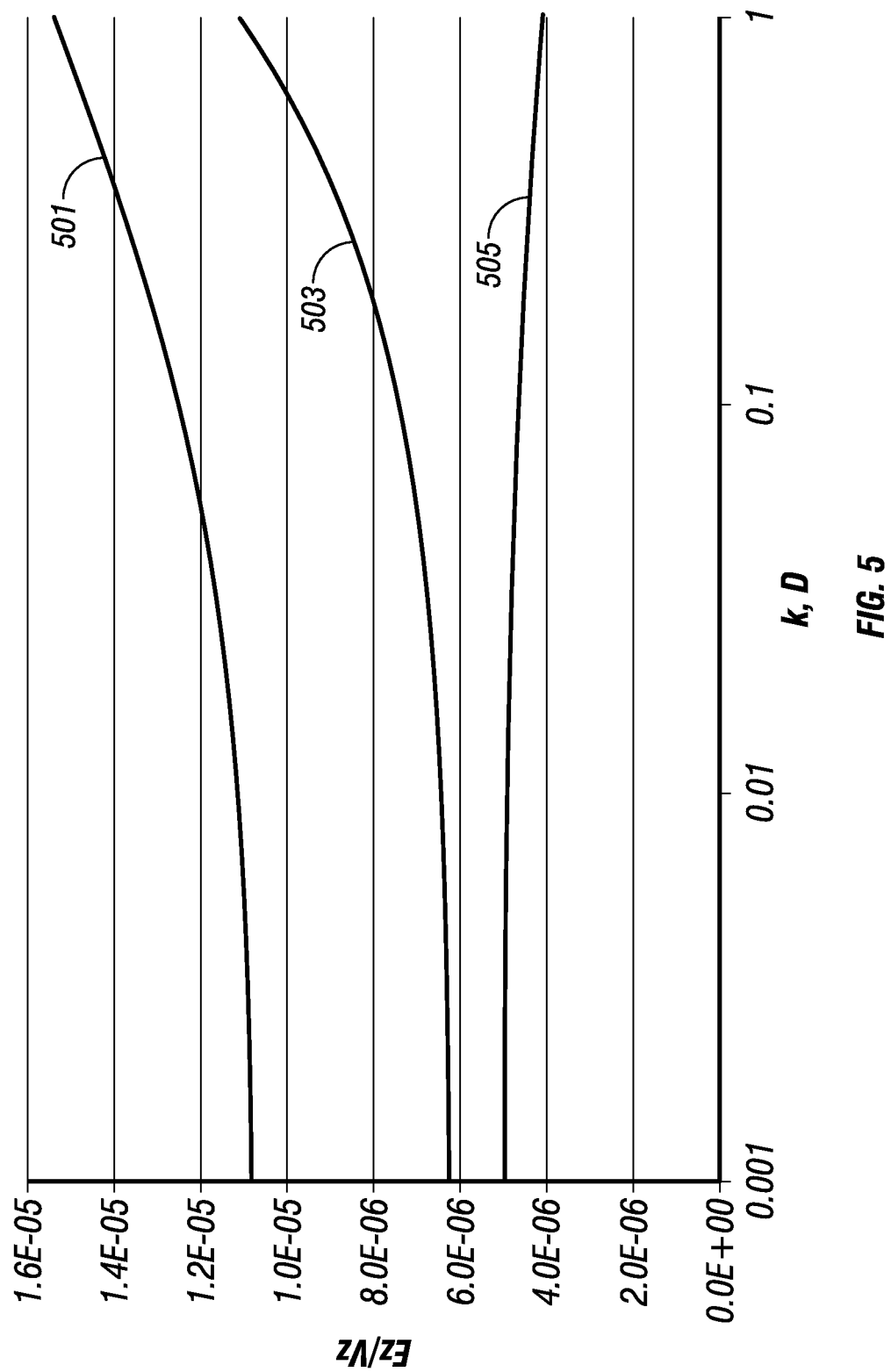

RADIAL WAVES IN A BOREHOLE AND STONELEY WAVES FOR MEASURING FORMATION PERMEABILITY AND ELECTROACOUSTIC CONSTANT

BACKGROUND OF THE DISCLOSURE

1. Field of the Disclosure

The present disclosure pertains to logging while drilling apparatus and more particularly to acoustic logging while drilling apparatus and generating and using Stoneley waves to measure formation permeability and electroacoustic constant.

2. Summary of the Related Art

Acoustic wellbore logging instruments are used to measure velocities of earth formations in one or more modes of acoustic energy propagation. Acoustic wellbore logging instruments are typically used in liquid-filled wellbores drilled through the earth formations. Velocity is generally determined using these instrument by measuring the time taken by an acoustic energy pulse to traverse a particular distance along the wall of the wellbore. The wall forms the interface between the liquid in the wellbore and the earth formations.

One form of acoustic energy pulses of particular interest to the invention is referred to as "Stoneley" waves. Stoneley waves, also known as tube waves, are essentially guided pressure pulses travelling in the wellbore. It had been determined in earlier research that a relationship is likely to exist between the transmission properties of Stoneley waves as they propagate along the wellbore, and the hydraulic characteristics of the formations along the wellbore wall. See for example, J. Rosenbaum, Synthetic Microseismograms: Logging in Porous Formations, Geophysics, vol. 39, pp. 14-32, Society of Exploration Geophysicists (1974). Determining formation permeability was not practical using the acoustic logging instruments available at the time the Rosenbaum reference was published because those instruments typically did not generate detectable Stoneley waves, and in the instances where they did so, separation of the Stoneley waves from the acoustic signals as detected was very difficult.

U.S. Pat. No. 5,784,333 to Tang et al., having the same assignee as the present disclosure and the contents of which are incorporated herein by reference, discloses a method for determining the permeability of earth formations penetrated by a wellbore from acoustic signals measured by an acoustic wellbore logging instrument. The method includes separating components from the measured acoustic signals which represent Stoneley waves propagating through the earth formations. Signals representing Stoneley waves propagating through the same earth formations are synthesized. The separated acoustic signal components and the synthesized Stoneley wave signals are compared. The permeability is determined from differences between the synthesized Stoneley wave signals and the separated acoustic signal components. In a preferred embodiment, the step of calculating the permeability includes inversion processing a wave center frequency shift and a wave travel time delay with respect to the permeability of the earth formations.

The present disclosure is directed towards a method and apparatus for directly measuring the formation permeability and the electroacoustic constant of a porous formation. It makes use of the fact that an elastic wave (such as a Stoneley wave) propagating along the borehole wall produces an electrical signal that can be measured.

SUMMARY OF THE DISCLOSURE

One embodiment of the disclosure is a method of evaluating an earth formation. The method includes: producing a state associated with a velocity of motion of a fluid in the borehole and a velocity of motion of the formation at an interface between the fluid and the formation such that a difference between the velocity of motion of the fluid in the borehole and the velocity of motion of the formation is dependent upon permeability; and using a processor to estimate an electroacoustic constant of the earth formation using a first measurement indicative of an electric charge on a wall of the borehole, wherein the first measurement is taken during the state. Producing the state may include using a swept frequency source in a borehole and identifying at least one frequency of the source producing the state by identifying from a plurality of frequencies in a frequency sweep a frequency of the source at which a corresponding difference between a corresponding fluid velocity in the borehole and a corresponding velocity of the formation is at a maximum.

Another embodiment of the disclosure is a system for evaluating an earth formation. The system includes: a swept frequency source on a tool configured to be conveyed into a borehole and generate a wave in a fluid in the borehole over a plurality of frequencies; a first sensor configured to make a first measurement indicative of a charge on a wall of the borehole at the plurality of frequencies; a second sensor configured to make a second measurement indicative of a velocity of the fluid in the borehole at the plurality of frequencies; a third sensor configured to make a third measurement indicative of a velocity of the wall of the borehole at the at least one resonant frequency; and a processor configured to: identify at least one resonant frequency of the borehole fluid within the plurality of frequencies, and use the first, second and third measurements at the at least one resonance frequency to estimate an electroacoustic constant of the earth formation. The processor may be further configured to estimate a permeability of the earth formation using an additional first measurement and additional measurements of the fluid velocity and the velocity of the formation at at least one additional frequency different from the at least one resonant frequency.

BRIEF DESCRIPTION OF THE FIGURES

For detailed understanding of the present disclosure, references should be made to the following detailed description of exemplary embodiment(s), taken in conjunction with the accompanying drawings, in which like elements have been given like numerals, wherein:

FIG. 5 shows the dependence of the ratio of the electric field to the velocity of deformation of the borehole upon permeability for different frequencies.

DETAILED DESCRIPTION OF THE EMBODIMENTS

Figure 1:
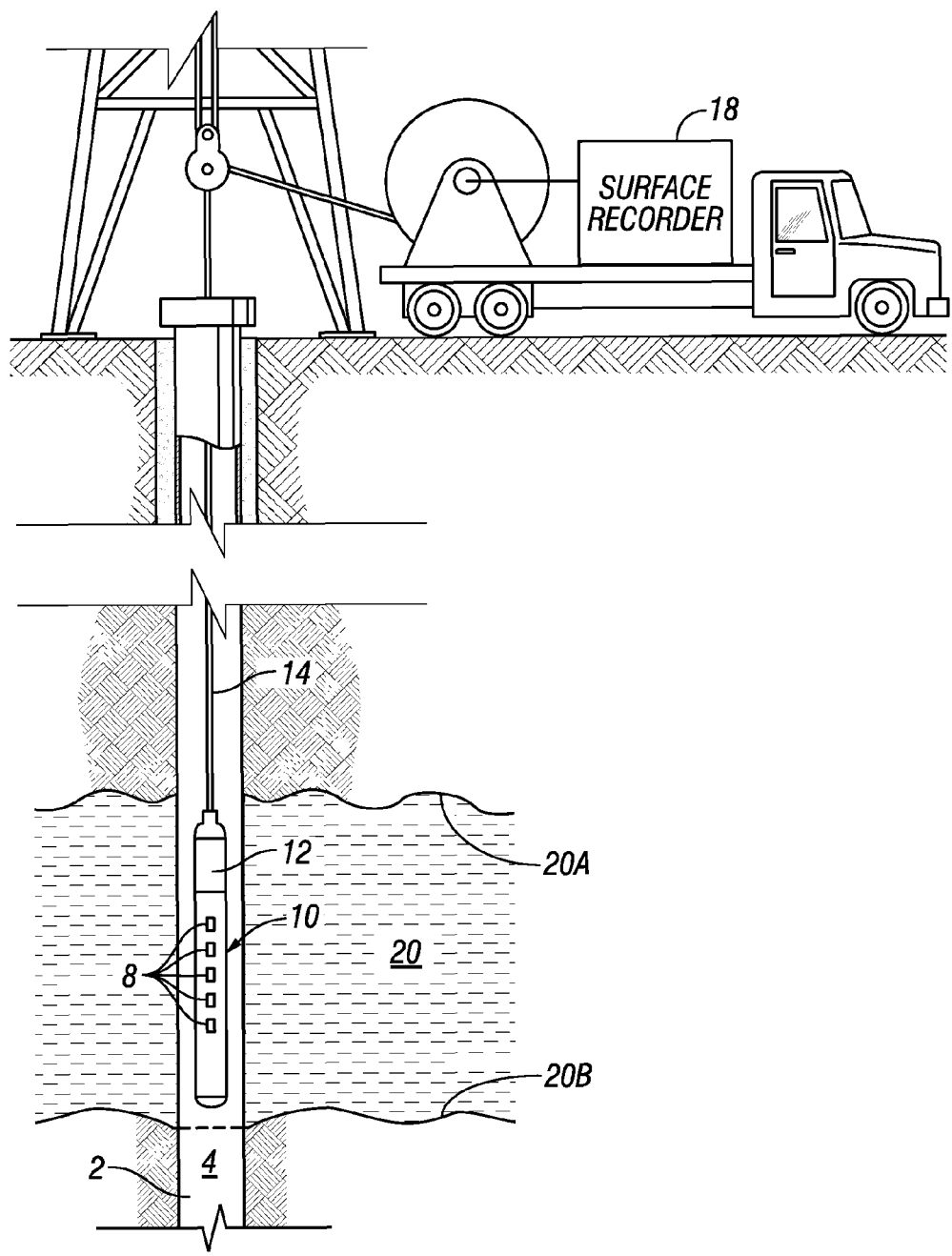
FIG. 1 shows an acoustic well logging instrument as it is used to acquire signals useful with the method of this invention.

FIG. 1 shows an acoustic well logging instrument as it is used to acquire signals suitable for processing according to the method of this disclosure. The instrument 10 is inserted into a wellbore 2 drilled through earth formations 20. The instrument 10 can be inserted into and withdrawn from the wellbore 2 by means of an armored electrical cable 14 spooled from a winch (not shown) or any similar conveyance known in the art.

The wellbore 2 is typically filled with a liquid 4, which can be "drilling mud" or any similar fluid usually used for drilling or completion of wellbores. The instrument includes a plurality of acoustic transmitter 8. The transmitters 8 are periodically energized and emit acoustic energy that radiate from the tool 10. The instrument 10 typically includes a telemetry module, shown generally at 12, which converts the electrical signals from the sensors (discussed with reference to FIG. 2) into a form suitable for recording and transmission over the cable 14 to a surface processor 18. It should be understood that the number of transmitters 8 as shown in FIG. 1 is only an example and is not meant to limit the invention.

Figure 2:
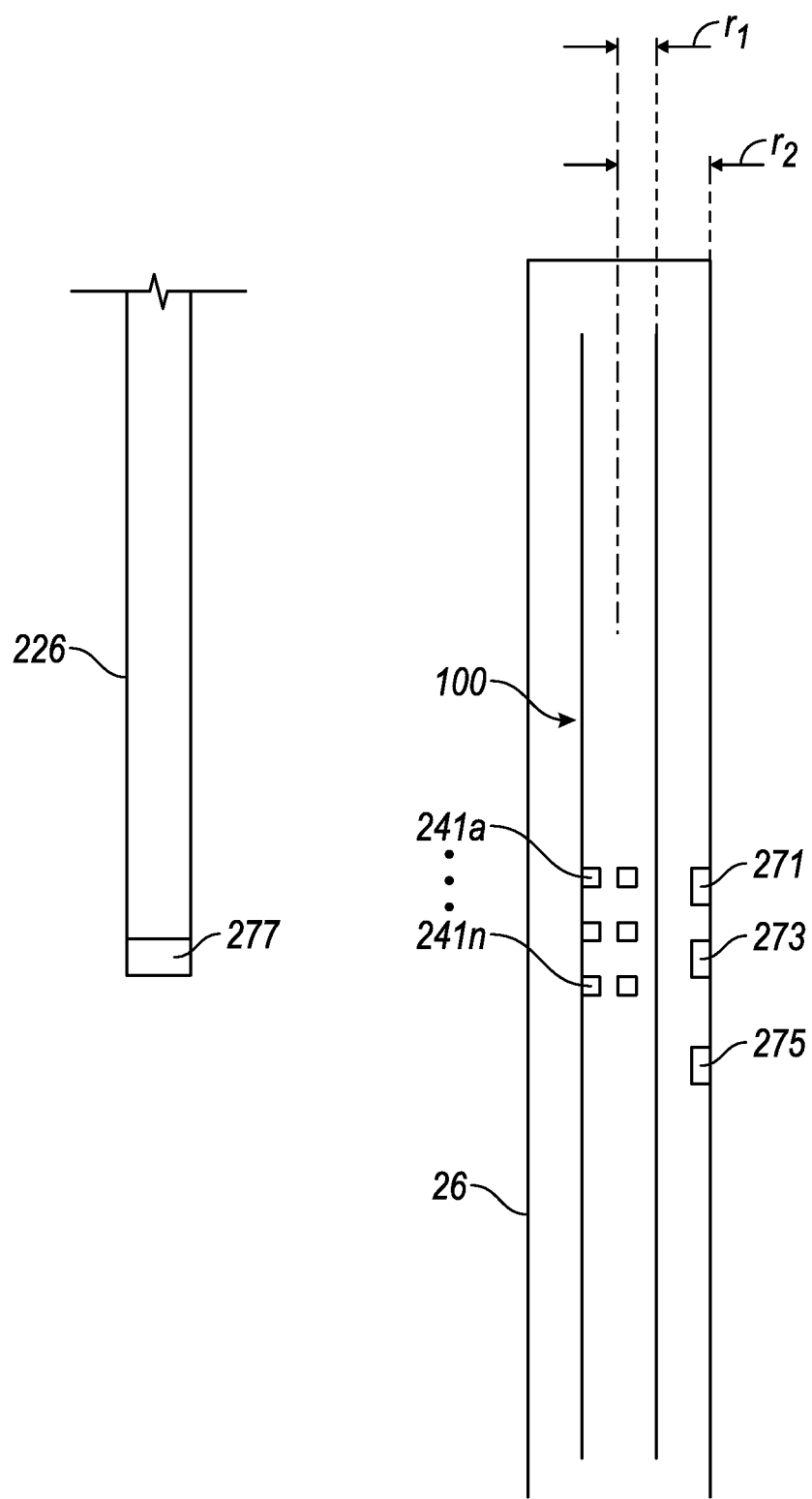
FIG. 2 is an illustration of an exemplary configuration of acoustic transmitters, a flow sensor, a geophone and an electrical charge sensor.

Shown in FIG. 2 are an array of transmitters 241a ... 241n. The arrays may include elements that are axially and/or circumferentially disposed. While the illustration shows them on a single housing, this is not to be construed as a limitation to the disclosure; a common configuration uses transmitters and receivers on more than one sub. Also shown in the figure is the borehole 26, and the logging tool 100. Also shown are a sensor 271 to measure the electric charge or field at the borehole wall, a sensor 273, such as a flow rate sensor, to measure the borehole fluid velocity and a motion sensor such as a geophone 275 to measure the velocity of the deformation of the borehole wall. The present disclosure includes two methods of measuring the surface charge (or the electric field in the porous medium). One is to connect an ammeter to the borehole wall as sensor 271 with the other end of the ammeter grounded: the measured current is indicative of the surface charge. A second method is drill pilot holes 226 in the formation and measure the potential difference between the borehole wall and the bottom of the pilot hole using a sensor 277 in the bottom of the pilot hole 226.

It should be noted that the disclosure is with reference to a wireline conveyed logging tool. This is not to be construed as a limitation, and the transmitter array for generating Stoneley waves could be on a bottomhole assembly (BHA) and used for imaging ahead of the borehole. This is discussed in U.S. Pat. No. 8,055,448 of Mathiszik et al., having the same assignee as the present disclosure and the contents of which are incorporated herein by reference.

With a monopole excitation of the elements of the transmitter array 241a ... 241n, radial excitation of the fluid in the borehole results. The theory of the radial oscillations, as it is shown below, shows that the electric charge appearing on the surface of the interface is determined by the following ratio:

$$Q|_{boundary} = \frac{E_r|_{boundary}}{4\pi} = \alpha \cdot \frac{\rho_l(v_r - u_r)|_{boundary}}{4\pi\sigma}. \quad (1)$$

In the above formula, $\alpha$ is the electroacoustic constant of the porous medium (the earth formation), $\sigma$ is electric conductivity, $\rho_l$ is partial density of fluid in the saturated porous medium (earth formation), $v_r - u_r$ is the difference between velocities of the saturating fluid and the porous matrix in the radial oscillations mode outside of the resonance zones. Having measured the difference between velocities $v_r - u_r$ (to this end, we could perform independent measurements of the fluid velocity $v_r^{(0)}$ and velocity $u_r^{(1)}$ of porous matrix next to the interface between the media, and based on these data, calculate the difference between velocities $u_r^{(1)} - v_r^{(1)} = (u_r^{(1)} - v_r^{(0)})/\phi$) and the surface electric charge using a special sensor, we can calculate the electroacoustic constant via the formula (1) above:

$$\alpha = \frac{4\pi\sigma Q|_{boundary}}{\rho_l(v_r - u_r)|_{boundary}}. \quad (2)$$

In order to estimate the electroacoustic constant using this method, the method includes a measurement of formation porosity $\phi$ using, for example, a neutron porosity logging tool. The partial density of the liquid $\rho_l$ is given by the product $\phi\rho_f^{ph}$ where the physical fluid density $\rho_f^{ph}$ is measured by a density logging tool, such as a gamma ray density tool. The conductivity of the formation fluid $\sigma$ may be measured by known methods.

Figure 3:
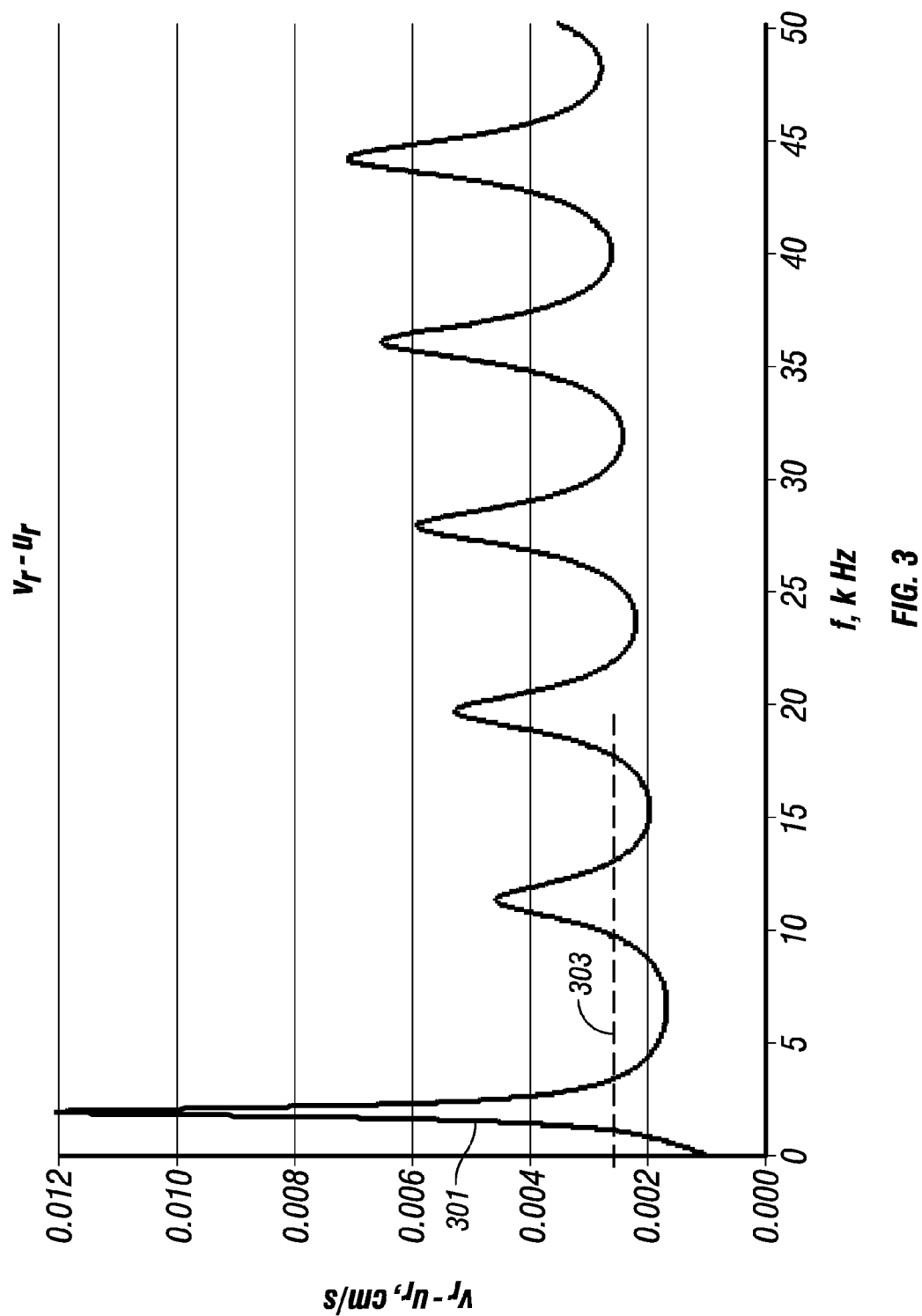
FIG. 3 is a plot of the difference between the velocities of the saturating fluid and the porous matrix a function of frequency.

An important comment should be made here. In the first approximation, the difference $v_r - u_r$ does not depend on permeability of the porous space k. FIG. 3 shows the dependence of the difference between velocities $v_r - u_r$ 301 (ordinate) upon the frequency of the signal (abscissa) for an exemplary model. The model parameters are: borehole liquid density $\rho_f = 1.0$ g/cm³; sound velocity in borehole liquid $c_{p0} = 1.45 \cdot 10^5$ cm/s; porous matrix density $\rho_s = 2.2$ g/cm³; saturated liquid density $\rho_f = 1.0$ g/cm³; porosity $\phi = 0.2$; first longitudinal sound velocity $c_{p1} = 2.2 \cdot 10^5$ cm/s; second longitudinal sound velocity $c_{p2} = 1.2 \cdot 10^5$ cm/s; share sound velocity $c_t = 1.6 \cdot 10^5$ cm/s; liquid viscosity $\mu = 1.05 \cdot 10^{-2}$ P; permeability k=50 mD; source radius $r_1 = 1.0$ cm; borehole radius $r_2 = 10$ cm.) The intersection of 301 with the line 303 gives an indication of the width of the resonance zones. The derivation of the curves follows from the theory presented below, discussed in Appendix I.

For the case where the formation is impermeable, then the configuration shown in FIG. 2 may be recognized as a waveguide for which the resonance frequencies depend upon the radius of the tool, the radius of the borehole and the velocity of compressional waves in the borehole. When the formation has a non-zero permeability, the configuration in FIG. 2 acts as a leaky waveguide with the leakage characteristics being dependent upon the permeability. This is the basis for the determination of formation permeability in the present disclosure.

Figure 4:
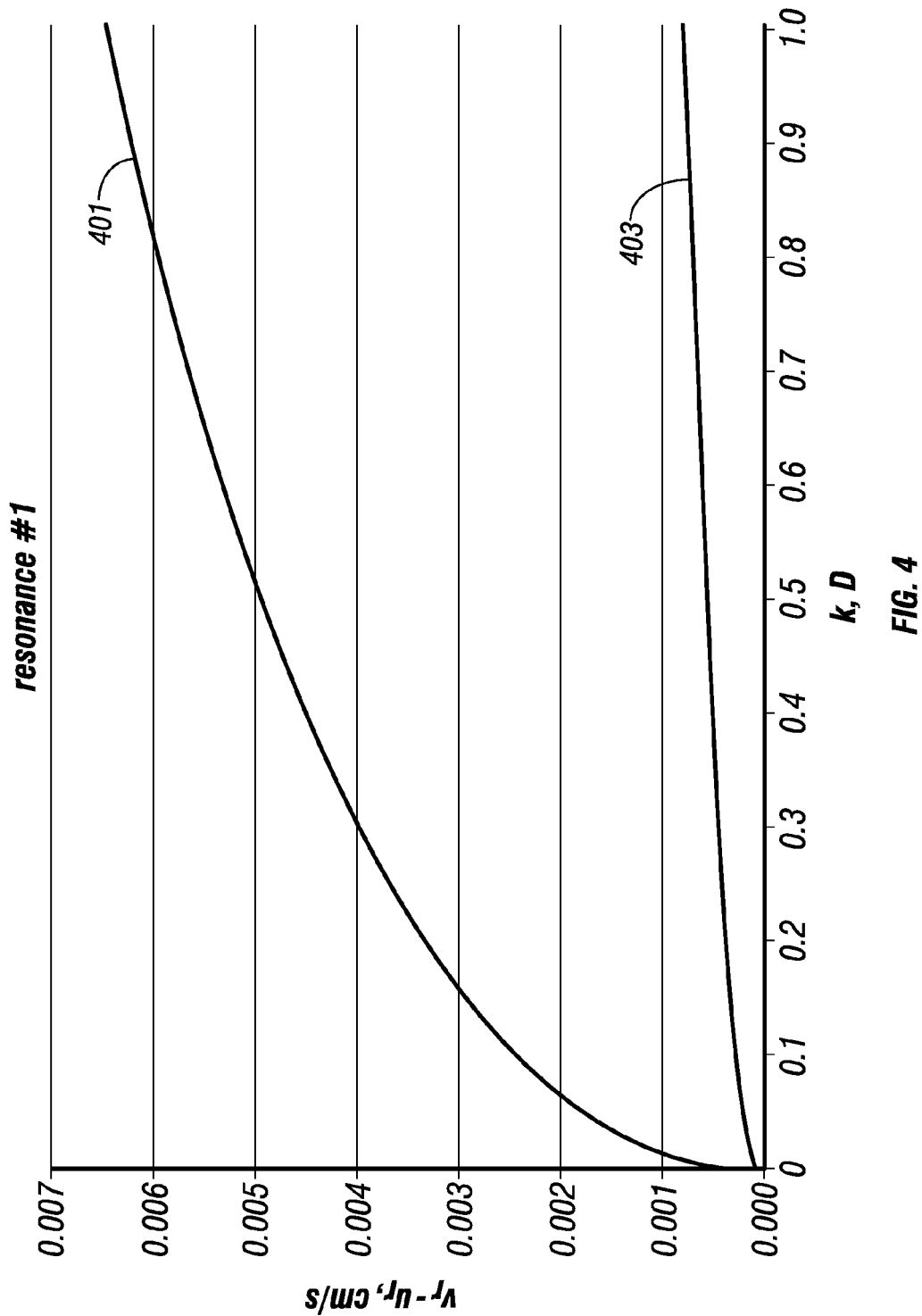
FIG. 4 shows an exemplary dependence of the difference in velocities of the saturating fluid and the porous matrix as a function of permeability.

FIG. 4 shows the dependence of the resonance on permeability. The abscissa is the permeability. The curve 401 shows the dependence of the difference in velocities on the permeability in a narrow resonance zone about 300 Hz wide at a frequency of 27.39 kHz. The curve 403 shows the dependence of the difference in velocities on permeability outside the resonance zone. Thus, outside of the resonance zone, the difference between velocities depends weakly on permeability, and we may assume, in the first approximation, that the surface electric charge formed on the interface does not depend on permeability as the surface electric charge is a function primarily of the electroacoustic constant. Similar results can be obtained for the other resonances in FIG. 3. We next discuss the electroacoustic ratio of the Stoneley wave.

As derived in the theory presented below in Appendix II, for the Stoneley wave, the ratio of the electric field $E_z$ amplitude to the amplitude $V_z$ in the acoustic wave which determined this field has the following form:

$$\frac{E_z}{V_z} = \alpha \cdot k \cdot f(\alpha, k), \qquad (3)$$

where $f(\alpha, k)$ is a function weakly dependent on its arguments. This dependence is illustrated in FIG. 5. Shown therein is a plot of $$\frac{E_z}{V_z}$$

as a function of permeability for frequencies of 30 kHz 501, 15 kHz 503 and 3 kHz 505.

When permeability changes by three orders of magnitude, the function changes only by the factor of two. Having the theoretical value of $f(\alpha, k)$, measured value of $E_z/V_z$, and computed value of $\alpha$ (see eqn. (2)), we can find permeability:

$$k = \frac{E_z/V_z}{\alpha f(\alpha, k)}. \qquad (4)$$

Thus, having performed two types of measurements: one with the radial waves and one with the electroacoustic ratio of the Stoneley wave, we first measure the electroacoustic constant and then, permeability. In order to improve accuracy of subsequent measurements, in one embodiment of the disclosure, an iterative procedure is used taking into account the weak functional dependence $f(\alpha, k)$ and $(v_r - u_r)|_{boundary}$ ($\alpha$, k). In such an iterative process, a first estimate of permeability is made ignoring the functional dependence, and the first estimate is used to calculate the functional dependence of $\alpha f(\alpha, k)$ and a revised value of the permeability is calculated.

The description above has been in terms of a device conveyed on a BHA on a drilling tubular into a borehole in the earth formation. The method and apparatus described above could also be used in conjunction with a logging string conveyed on a wireline into the earth formation. For the purposes of the present disclosure, the BHA and the logging string may be referred to as a "downhole assembly." It should further be noted that while the example shown depicted the transmitter assembly and the receiver assembly on a single tubular, this is not to be construed as a limitation of the disclosure. It is also possible to have a segmented acoustic logging tool to facilitate conveyance in the borehole. Once the formation permeability has been estimated, it can be used for further reservoir development operations.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation velocities and boundary locations may be recorded on a suitable medium and used for subsequent processing upon retrieval of the BHA. The determined formation permeability and electroacoustic constant may further be telemetered uphole for display and analysis.

APPENDIX I

To measure permeability in the saturated porous medium, a theory that describes the radial waves based on the linearized version of the filtration theory is used. To describe the acoustic field in fluid, the following equation is used:

$$\ddot{v} - c_{p0}^2 \nabla \text{ div } v = 0. \qquad (I.1)$$

Here $c_{p0}$ is the velocity of sound in borehole fluid. The electrical field in porous medium is defined by $$E = -\frac{\alpha \rho_l}{\sigma}(u - v), \qquad (I.2)$$

where $\alpha$ is the electroacoustic constant of the porous medium, and $\sigma$ is the electric conductivity of the porous medium. Velocities u, v of the matrix of the porous medium and the fluid contained therein satisfy equations $$\ddot{u} - c_t^2 \Delta u - a_1 \nabla \text{div} u + a_2 \nabla \text{div} v + \frac{\rho_l}{\rho_s} b(\dot{u} - \dot{v}) = 0, \qquad (I.3)$$

$$\ddot{v} + a_3 \nabla \text{div} u - a_4 \nabla \text{div} v - b(\dot{u} - \dot{v}) = 0. \qquad (I.4)$$

Here $\rho_l$, $\rho_s$ are partial densities of the saturating fluid and the porous matrix, respectively, $\rho = \rho_l + \rho_s$ is density of the saturated porous medium. The dissipative coefficient is $b = \rho_l \chi = \eta/(k\rho)$, where $\eta$ is dynamic viscosity the saturating fluid, k is permeability.

Equation coefficients $a_j$ (j=1, ..., 4) are determined by the elasticity moduli $\lambda$, $\mu$, and $\gamma$:

$$a_1 = \frac{1}{\rho_s}\left(\frac{\rho_s^2}{\rho^2}\gamma + \frac{\rho_l^2}{\rho^2}K + \frac{1}{3}\mu\right), a_2 = \frac{\rho_l}{\rho_s}\left(\frac{\rho_l}{\rho^2}K - \frac{\rho_s}{\rho^2}\gamma\right), \qquad (I.5)$$

$$a_3 = \frac{\rho_l}{\rho^2}K - \frac{\rho_s}{\rho^2}\gamma, a_4 = \frac{\rho_l}{\rho^2}K + \frac{\rho_l}{\rho^2}\gamma, \qquad (I.6)$$

where $K = \lambda + 2\mu/3$. Three elasticity moduli $\mu$, $\lambda$, and $\gamma$ are determined univalently by three measurable velocities of sound in saturated porous medium (two compressional velocities $c_{p1}$, $c_{p2}$ and one shear velocity $c_t$)

$$\mu = \rho_s c_t^2, \qquad (I.7)$$

$$K = \frac{1}{2}\frac{\rho_s}{\rho_l}\left(\rho c_{p1}^2 + \rho c_{p2}^2 - \frac{8}{3}\rho_l c_t^2 - \sqrt{(\rho c_{p1}^2 - \rho c_{p2}^2)^2 - \frac{64}{9}\rho_s \rho_l c_t^4}\right), \qquad (I.8)$$

$$\gamma = \frac{1}{2}\left(\rho c_{p1}^2 + \rho c_{p2}^2 - \frac{8}{3}\rho_s c_t^2 + \sqrt{(\rho c_{p1}^2 - \rho c_{p2}^2)^2 - \frac{64}{9}\rho_s \rho_l c_t^4}\right). \qquad (I.9)$$

The acoustic source in the system is a finite-size harmonic pressure generator $p = P_0 e^{-i\omega t}$ located in the center of the wellbore. The acoustic response of the system under study is also harmonic $(u, v) \rightarrow (u, v)e^{-i\omega t}$. The latter fact enables us to keep the following coordinate dependence of equations (I.1, I.2, I.3) in Fourier amplitudes of the radial wave velocities $u(u_r, 0, 0)$, $v(v_r, 0, 0)$:

$$\lambda_0 \nabla \text{ div } v + v = 0 \qquad (I.10)$$

And $$\bar{a}_0 \Delta u - \bar{a}_2 \Delta v + (1+\epsilon\bar{b})u - \epsilon\bar{b}v = 0, \ (r_2 < r < \infty), \qquad (I.11)$$

$$-\bar{a}_3 \Delta u + \bar{a}_4 \Delta v - \bar{b}u + (1+\bar{b})v = 0, \ (r_2 < r < \infty). \qquad (I.12)$$

Here we have dimensionless equations where velocities u, v are in units of $c_t$, coordinates are in units of $c_t/\omega$; coefficients are transformed: $\lambda_0 = c_{p0}^2/c_t^2$, $\bar{a}_i = a_i/c_t^2$ (i=0, ..., 4), $\bar{b}=ib/\omega$; $\epsilon = \rho_f/\rho_s$, $\bar{a}_0 = \bar{a}_1 + 1$.

The electrical field in dimensionless form is defined by $$E = -\frac{c_e}{c_t}(u-v), \qquad (I.13)$$

where $c_e$ is the velocity of light, E is in units of $\alpha c_e \rho_f/\sigma$. Let us find common solutions to equations (I.10-I.12).

To reduce the equations described the acoustic field in porous medium to the diagonal form, the set (I.11-I.12) could be conveniently expressed in the matrix form.

$$A \Delta U + W U = 0 \qquad (I.14)$$

Here $$U = \begin{pmatrix} u_r \\ v_r \end{pmatrix}, A = \begin{pmatrix} \bar{a}_0 & -\bar{a}_2 \\ -\bar{a}_3 & \bar{a}_4 \end{pmatrix}, W = \begin{pmatrix} (1+\epsilon\bar{b}) & -\epsilon\bar{b} \\ -\bar{b} & (1+\bar{b}) \end{pmatrix}. \qquad (I.15)$$

Having multiplied set (I.12) by the inverse matrix $$W^{-1} = \begin{pmatrix} \frac{(1+\bar{b})}{\det W} & \frac{\epsilon\bar{b}}{\det W} \\ \frac{\bar{b}}{\det W} & \frac{(1+\epsilon\bar{b})}{\det W} \end{pmatrix},$$

where det $W = 1+(1+\epsilon)\bar{b}$, we arrive at the set of equations:

$$H \Delta U + U = 0 \qquad (I.16)$$

with this matrix of coefficients: $H = W^{-1}A$ $$h_{11} = ((1+\bar{b})\bar{a}_0 - \epsilon\bar{b}\bar{a}_3)/\det W, \ h_{12} = (-(1+\bar{b})\bar{a}_2 + \epsilon\bar{b}\bar{a}_4)/\det W,$$

$$h_{21} = (\bar{b}\bar{a}_0 - (1+\epsilon\bar{b})\bar{a}_3)/\det W, \ h_{22} = (-\bar{b}\bar{a}_2 + (1+\epsilon\bar{b})\bar{a}_4)/\det W \qquad (I.17)$$

To reduce set (I.14) to the diagonal form, we multiply it by the matrix $$R = \begin{pmatrix} R_1 & R_2 \\ R_3 & R_4 \end{pmatrix},$$

as found from this problem solution for the eigenvalues of the matrix $$H: HR = R\Lambda \qquad (I.18)$$

as the matrix compiled of the right-hand side eigenvectors, $$R: \left( \begin{pmatrix} R_1 \\ R_3 \end{pmatrix} \begin{pmatrix} R_2 \\ R_4 \end{pmatrix} \right).$$

Components of the transform matrix R (or eigenvectors of the matrix H) have the following:

$$R_1 = 1, R_2 = (\lambda_2 - h_{22})/h_{21}, R_3 = h_{21}/(\lambda_1 - h_{22}), R_4 = 1. \qquad (I.19)$$

The matrix of eigenvectors $$\Lambda = \begin{pmatrix} \lambda_1 & 0 \\ 0 & \lambda_2 \end{pmatrix}$$

is diagonal, so that $R^{-1} H R = \Lambda$, and eigenvalues $\lambda_1$, $\lambda_2$ can be expressed as follows:

$$\lambda_1 = \tfrac{1}{2}\text{tr } H + \sqrt{\tfrac{1}{2}(\text{tr}H)^2 - \det H}, \ \lambda_2 = \tfrac{1}{2}\text{tr } H - \sqrt{\tfrac{1}{2}(\text{tr}H)^2 - \det H}, \qquad (I.20)$$

where tr $H = h_{11} + h_{22}$ is the trace of the matrix H, det $H = h_{11}h_{22} - h_{12}h_{21}$ is the determinant of matrix H.

The vector-column of functions is transformed as follows:

$$R^{-1} u = V, \text{ where } V = \begin{pmatrix} v_1 \\ v_2 \end{pmatrix}. \qquad (I.21)$$

After transformation, set (I.16) becomes diagonal:

$$\Lambda \Delta V + V = 0, \qquad (I.22)$$

or, in coordinate notations (prime denotes the derivative with respect to the radius):

$$v_1'' + \frac{1}{r} v_1' + \left( \frac{1}{\lambda_1} - \frac{1}{r^2} \right) v_1 = 0 \qquad (I.23)$$

$$v_2'' + \frac{1}{r} v_2' + \left( \frac{1}{\lambda_2} - \frac{1}{r^2} \right) v_2 = 0 \qquad (I.24)$$

The initial velocities can be expressed via functions $v_1$, $v_2$ (I.21):

$$u_r = v_1 + R_2 v_2, \ v_r = R_3 v_1 + v_2. \qquad (I.25)$$

The Acoustic equation (I.10) for the borehole fluid can be expressed similarly:

$$v_r'' + \frac{1}{r} v_r' + \left( \frac{1}{\lambda_0} - \frac{1}{r^2} \right) v_r = 0. \qquad (I.26)$$

The set of equations (I.23, I.24, I.26) taking into account (I.25) describes the acoustic field of the radial waves in the wellbore and in the formation beyond the wellbore. The boundary conditions for this geometry (in the dimensionless case) are the following (the index in brackets denotes values pertaining to the fluid $^{(0)}$ and the saturated porous medium $^{(1)}$):

1) On the surface of the source exciting the oscillations in the fluid, ($r=r_1$, FIG. 2), a harmonic source is set:

$$p^{(0)} = \bar{P}_0 \qquad (I.27)$$

2) On the interface between the borehole and the saturated porous medium r=$r_2$, FIG. 2), continuity of the medium is assumed, as well as continuity of the full stress tensors ($\Sigma_{rr}^{(1)}$, $\Sigma_{rr}^{(0)}$) and the partial pressures:

$$(1-\phi)u_r^{(1)}+\phi v_r^{(1)}=v_r^{(0)}, \quad (I.28)$$

$$\sum_{rr}^{(1)} = \sum_{rr}^{(0)}, \quad (I.29)$$

$$\frac{p^{(1)}}{\rho^{(1)}} - \kappa \frac{\rho^{(1)}}{\rho_s^{(1)}}\overline{b}(\varphi_u^{(1)} - \varphi_v^{(1)}) = \frac{p^{(0)}}{\rho^{(0)}}. \quad (I.30)$$

Here $\phi$ is porosity, $\phi_{u,v}$ are potentials which determine the velocity of the radial waves in the medium u=$\nabla\phi_u$, v=$\nabla\phi_v$, $\kappa$ is a conditional coefficient which enables us to change the friction force at the boundary, $\overline{P}_0 = P_0/(\rho_s c_t^2)$.

The final boundary condition follows from a more general continuity condition for the partial stress tensor in fluid.

$$\Sigma_{rr}^{l(1)} = \phi \Sigma_{rr}^{(0)}, \quad (I.30')$$

where $\Sigma_{rr}^{(1)} = \Sigma_{rr}^{s(1)} + \Sigma_{rr}^{l(1)}$.

Components of stress tensors and pressure are determined via displacement velocities as follows:

$$-\dot{p}^{(1)} = \pi_1 \text{ div } u^{(1)} + \pi_2 \text{ div } v^{(1)}, \quad (I.31)$$

$$\dot{\Sigma}_{rr}^{(1)} = \pi_3 \text{ div } u^{(1)} + \pi_4 \text{ div } v^{(1)} + 2u_r', \quad (I.32)$$

$$\dot{\Sigma}_{rr}^{(0)} = -\dot{p}^{(0)} = \pi_0 \text{ div } v^{(0)}, \quad (I.33)$$

where the following is determined:

$$\pi_1 = \left(\frac{\rho_s}{\rho}\gamma - \frac{\rho_l}{\rho}K\right)/(\rho_s c_t^2), \pi_2 = \left(\frac{\rho_s}{\rho}\gamma - \frac{\rho_l}{\rho}K\right)/(\rho_s c_t^2), \quad (I.34)$$

$$\pi_3 = \left(\frac{\rho_s}{\rho}\gamma - \frac{2}{3}\mu\right)/(\rho_s c_t^2), \pi_4 = \left(\frac{\rho_l}{\rho}\gamma\right)/(\rho_s c_t^2), \quad (I.35)$$

$$\pi_0 = \rho^{(0)}c_{p0}^2/(\rho_s c_t^2). \quad (I.36)$$

The set of equations (I.23, I.24, I.26) with boundary conditions (I.27-I.30) for geometry shown in FIG. 1 has a solution that is expressed via the Hankel functions $H_\alpha^{(1)}(z)$, $H_\alpha^{(2)}(z)$. In the saturated porous medium, this solution in a dimensionless form is
for pressure:

$$p^{(0)} - iB_1(\pi_1 + \pi_2 R^3)H_1^{(1)}(r/\sqrt{\lambda_1})/\sqrt{\lambda_1} - iB_2(\pi_1 R_2 + \pi_2)H_1^{(1)}(r/\sqrt{\lambda_2})/\sqrt{\lambda_2}, \quad (I.37)$$

and for the solid matrix velocities and velocities of the saturating fluid:

$$u_r^{(1)} = B_1 H_1^{(1)}(r/\sqrt{\lambda_1}) + B_2 R_2 H_1^{(1)}(r/\sqrt{\lambda_2}), \quad (I.38)$$

$$v_r^{(1)} = B_1 R_3 H_1^{(1)}(r/\sqrt{\lambda_1}) + B_2 H_1^{(1)}(r/\sqrt{\lambda_2}), \quad (I.39)$$

and, consequently, for the difference of the matrix and fluid velocities:

$$u_r^{(1)} - v_r^{(1)} = B_1(1-R_3)H_1^{(1)}(r/\sqrt{\lambda_1}) + B_2(R_2-1)H_1^{(1)}(r/\sqrt{\lambda_2}), \quad (I.40)$$

and electrical field $$E_r^{(1)} = -\frac{c_e}{c_t}(u_r^{(1)} - v_r^{(1)}). \quad (I.41)$$

In the wellbore, this solution in a dimensionless form is:
for pressure in fluid $$p^{(0)} = -iB_0\pi_0 H_1^{(1)}(r/\sqrt{\lambda_0})/\sqrt{\lambda_0} - iC_0\pi_0 H_1^{(2)}(r/\sqrt{\lambda_0})/\sqrt{\lambda_0}, \quad (I.42)$$

for the fluid velocity $$v_r^{(0)} = B_0 H_1^{(1)}(r/\sqrt{\lambda_0}) + C_0 H_1^{(2)}(r/\sqrt{\lambda_0}). \quad (I.43)$$

Integration constants $B_1$, $B_2$, $B_0$, $C_0$ are determined by the condition that boundary problem solutions (I.20, A.21, A.23) are to satisfy boundary conditions (I.24-I.27). Substituting solutions (I.34-I.40) into boundary conditions (I.24-I.27), we arrive at this set:

$$G\Xi = P, \quad (I.44)$$

where one can see the column vector of the integration constants $\Xi$, the source part P, and the coefficient matrix G:

$$\Xi = \begin{pmatrix} B_1 \\ B_2 \\ B_0 \\ C_0 \end{pmatrix}, P = \begin{pmatrix} \overline{P}_0 \\ 0 \\ 0 \\ 0 \end{pmatrix}, G = \begin{pmatrix} g_{11} & g_{12} & g_{13} & g_{14} \\ g_{21} & g_{22} & g_{23} & g_{24} \\ g_{31} & g_{32} & g_{33} & g_{34} \\ g_{41} & g_{42} & g_{43} & g_{44} \end{pmatrix}, \quad (I.45)$$

Where $$g_{11}=0, g_{12}=0, \quad (I.46)$$

$$g_{13}=\pi_0 H_0^{(1)}(r_1/\sqrt{\lambda_0})/\sqrt{\lambda_0}, g_{14}=\pi_0 H_0^{(2)}(r_1/\sqrt{\lambda_0})/\sqrt{\lambda_0}, \quad (I.47)$$

$$g_{21}=((1-\phi)+\phi R_3)H_1^{(1)}(r_2/\sqrt{\lambda_1}), g_{22}=((1-\phi)R_2+\phi)H_1^{(1)}(r_2/\sqrt{\lambda_2}), \quad (I.48)$$

$$g_{23}=-H_1^{(1)}(r_2/\sqrt{\lambda_0}), g_{24}=-H_1^{(2)}(r_2/\sqrt{\lambda_0}), \quad (I.49)$$

$$g_{31}=(\pi_3+\pi_4 R_3+2)H_0^{(1)}(r_2/\sqrt{\lambda_1})/\sqrt{\lambda_1} - 2H_1^{(1)}(r_2/\sqrt{\lambda_1})/r_2, \quad (I.50)$$

$$g_{32}=(\pi_3 R_2+\pi_4+2)H_0^{(1)}(r_2/\sqrt{\lambda_2})/\sqrt{\lambda_2} - 2R_2 H_1^{(1)}(r_2/\sqrt{\lambda_2})/r_2, \quad (I.51)$$

$$g_{33}=-\pi_0 H_0^{(1)}(r_2/\sqrt{\lambda_0})/\sqrt{\lambda_0}, g_{34}=-\pi_0 H_0^{(2)}(r_2/\sqrt{\lambda_0})/\sqrt{\lambda_0}, \quad (I.52)$$

$$g_{41}=((\pi_1+\pi_2 R_3)\lambda_1+i\kappa\overline{b}(1-R_3))H_0^{(1)}(r_2/\sqrt{\lambda_1})/\sqrt{\lambda_1}, \quad (I.53)$$

$$g_{42}=((\pi_1 R_2+\pi_2)\lambda_2+i\kappa\overline{b}(R_2-1))H_0^{(1)}(r_2/\sqrt{\lambda_2})/\sqrt{\lambda_2}, \quad (I.54)$$

$$g_{43}=-(\rho^{(1)}/\rho^{(0)})\pi_0 H_0^{(1)}(r_2/\sqrt{\lambda_0})/\sqrt{\lambda_0}, \quad (I.55)$$

$$g_{44}=-(\rho^{(1)}/\rho^{(0)})\pi_0 H_0^{(2)}(r_2/\sqrt{\lambda_0})/\sqrt{\lambda_0}, \quad (I.56)$$

The solution to set (I.44) yields integration constants $B_1$, $B_2$, $B_0$, $C_0$:

$$\Xi = G^{-1}P. \quad (I.57)$$

It should be noted that pressure is in the units of the elastic modulus $\mu = \rho_s c_t^2$, and velocities u, v are in the units of the shear sound velocity $c_t$.

APPENDIX II

The theory describing propagation of the guided Stoneley waves at the interface of the fluid and the deformed saturated porous medium is, as in Appendix I, based on a linearized version of the filtration theory.

The acoustic and electrical fields in fluid are described by the following linear equation:

$$\ddot{v} - c_{p0}^2 \nabla \, divv = 0, \tag{II.1}$$

$$\dot{B} - \frac{c_e^2}{4\pi\sigma} \Delta B = 0, \tag{II.2}$$

$$E = \frac{c_e}{4\pi\sigma} rotB. \tag{II.3}$$

The acoustic and electrical fields in the saturated porous medium are described by the following set of linear equations:

$$\ddot{u} - c_t^2 \Delta u - a_1 \nabla \, divu + a_2 \nabla \, divv + \frac{\rho_l}{\rho_s} b_\alpha(\dot{u} - \dot{v}) + \frac{\rho_l}{\rho_s} b_e rotB = 0, \tag{II.4}$$

$$\ddot{v} + a_3 \nabla \, divu - a_4 \nabla \, divv - b_\alpha(\dot{u} - \dot{v}) - b_e rotB = 0, \tag{II.5}$$

$$\dot{B} - \frac{c_e^2}{4\pi\sigma} \Delta B - \frac{\alpha c_e \rho_l}{\sigma} rot(u - v) = 0, \tag{II.6}$$

$$E = \frac{c_e}{4\pi\sigma} rotB - \frac{\alpha \rho_l}{\sigma}(u - v). \tag{II.7}$$

Here $\rho_l$, $\rho_s$ are partial densities of the saturating fluid and the porous matrix, respectively, $\rho = \rho_l + \rho_s$ is density of the saturated porous medium, u is the velocity of the porous matrix, v is the velocity of the saturating fluid or the borehole fluid, $c_{p0}$ is the velocity of sound in the borehole fluid. The dissipative coefficients are $b_\alpha = \rho_l \chi(1 - \alpha^2/(\sigma\chi))$, $\chi = \eta/(k\rho_l\rho)$, $b_e = \alpha c_e/(4\pi\sigma)$, where $\eta$ is dynamic viscosity the saturating fluid, k is permeability, $\alpha$ is the electroacoustic constant of the porous medium, $\sigma$ is electric conductivity, $c_e$ is the velocity of light. Coefficients $\alpha_j$ in the equations above are determined by three elastic moduli $\lambda$, $\mu$, $\gamma$:

$$a_1 = \frac{1}{\rho_s}\left(\frac{\rho_s^2}{\rho^2}\gamma + \frac{\rho_l^2}{\rho^2}K + \frac{1}{3}\mu\right), \ a_2 = \frac{\rho_l}{\rho_s}\left(\frac{\rho_l}{\rho^2}K - \frac{\rho_s}{\rho^2}\gamma\right), \tag{II.8}$$

$$a_3 = \frac{\rho_l}{\rho^2}K - \frac{\rho_s}{\rho^2}\gamma, \ a_4 = \frac{\rho_l}{\rho^2}K + \frac{\rho_l}{\rho^2} \tag{II.9}$$

where $K = \lambda + \frac{2}{3}\mu$.

Three elastic moduli $\lambda$, $\mu$, and $\gamma$ are found via the acoustic velocities of the saturated porous medium: the first compressional velocity $c_{p1}$, the second compressional velocity $c_{p2}$, shear velocity $c_t$, measured at high frequency:

$$\mu = \rho_s c_t^2, \tag{II.10}$$

$$K = \frac{1}{2}\frac{\rho_s}{\rho_l}\left(\rho c_{p1}^2 + \rho c_{p2}^2 - \frac{8}{3}\rho_l c_t^2 - \sqrt{(\rho c_{p1}^2 - \rho c_{p2}^2)^2 - \frac{64}{9}\rho_s \rho_l c_t^4}\right), \tag{II.11}$$

$$\gamma = \frac{1}{2}\left(\rho c_{p1}^2 + \rho c_{p2}^2 - \frac{8}{3}\rho_s c_t^2 + \sqrt{(\rho c_{p1}^2 - \rho c_{p2}^2)^2 - \frac{64}{9}\rho_s \rho_l c_t^4}\right). \tag{II.12}$$

These are considered known quantities.
Let us present equations (II.1-II.7) in the dimensionless form, like in Appendix I:
in the borehole fluid:

$$\lambda_0 \nabla \, divv + v = 0, \tag{II.13}$$

$$ig\Delta B - B = 0, \tag{II.14}$$

$$E = \frac{c_t}{c_e} grotB \tag{II.15}$$

in the saturated porous medium:

$$\Delta u + \bar{a}_1 \nabla \, divu - \bar{a}_2 \nabla \, divv + (1 + \varepsilon \bar{b}_\alpha)u - \varepsilon \bar{b}_\alpha v + \varepsilon \bar{b}_e rotB = 0, \tag{II.16}$$

$$-\bar{a}_3 \nabla \, divu + \bar{a}_4 \nabla \, divv - \bar{b}_\alpha u + (1 + \bar{b}_\alpha)v - \bar{b}_e rotB = 0, \tag{II.17}$$

$$ig\Delta B + irot(u - v) - B = 0, \tag{II.18}$$

$$E = \frac{c_t}{c_e} grotB - \frac{c_t}{c_e}(u - v). \tag{II.19}$$

Here, velocities u, v are in units of the shear velocity of sound $c_t$; coordinates—in units of $c_t/\omega$; B—in units of $\alpha c_e \rho_l/\sigma$. Dimensionless coefficients in these equations are: $\lambda_0 = c_{p0}^2/c_t^2$, $\bar{a}_i = a_i/c_t^2$, $\bar{b}_\alpha = ib_\alpha/\omega$, $\varepsilon = \rho_l/\rho_s$, $g = \omega c_e^2/(4\pi\sigma c_t^2)$, $\bar{b}_e = i\alpha^2 \rho_l c_e^2/(4\pi\sigma^2 c_t^2)$.

To study dispersive properties of the Stoneley waves, one needs the dispersion ratio. To obtain it, let us introduce potentials which will enable us to separate compressional and shear waves in the medium under consideration, with the help of the following equations:

$$u = \nabla \varphi_u - rot\, \psi_u, \tag{II.20}$$

$$v = \nabla \varphi_v - rot\, \psi_v. \tag{II.21}$$

To study the Stoneley waves with the source in the center of the wellbore, it suffices to keep the cylindrical symmetry of the problem. The hydrodynamic velocities of the media should have components $u = (u_r, 0, u_z)$ and $v = (v_r, 0, v_z)$, while vector potentials have only a single component $\psi_u = (0, \psi_u, 0)$ and $\psi_v = (0, \psi_v, 0)$. The magnetic field should have component $B = (0, B_\phi, 0)$.

In cylindrical coordinates, equations (II.20, II.21) have the following form:

$$u_r = \partial_r \varphi_u + \partial_z \psi_u, \ u_z = \partial_z \varphi_u - \partial_r \psi_u - \frac{1}{r}\psi_u, \tag{II.22}$$

$$v_r = \partial_r \varphi_v + \partial_z \psi_v, \ v_z = \partial_z \varphi_v - \partial_r \psi_v - \frac{1}{r}\psi_v. \tag{II.23}$$

Two independent sub-systems describing compressional and shear waves in the saturated porous medium are obtained via substituting (II.22, II.23) in (II.16-II.18):

$$(\bar{a}_1 + 1)\Delta\phi_u - \bar{a}_2\Delta\phi_v + (1 + \varepsilon\bar{b}_\alpha)\phi_u - \varepsilon\bar{b}_\alpha\phi_v = 0, \tag{II.24}$$

$$-\bar{a}_3\Delta\phi_u + \bar{a}_4\Delta\phi_v - \bar{b}_\alpha\phi_u + (1 + \bar{b}_\alpha)\phi_v = 0, \tag{II.25}$$

$$\Delta_\phi \psi_u + (1 + \varepsilon\bar{b}_\alpha)\psi_u - \varepsilon\bar{b}_\alpha\psi_v - \varepsilon\bar{b}_e B_\phi = 0, \tag{II.26}$$

$$-\bar{b}_\alpha\psi_u + (1 + \bar{b}_\alpha)\psi_v + \bar{b}_e B_\phi = 0, \tag{II.27}$$

$$ig\Delta_\phi B_\phi + i\Delta_\phi \psi_u - i\Delta_\phi \psi_v - B_\phi = 0. \tag{II.28}$$

Here we define the operators $$\Delta\varphi = \partial_r^2 \varphi + \frac{1}{r}\partial_r\varphi + \partial_z^2\varphi \text{ and}$$

$$\Delta_\varphi\psi_i = \partial_r^2\psi_i + \frac{1}{r}\partial_r\psi_i - \frac{1}{r^2}\psi_i + \partial_z^2\psi_i.$$

Along the z axis, for the symmetry assumed, the Stoneley wave is a plane wave:

$$(\phi_u,\phi_v,\psi_u,\psi_v,B) \to (\phi_u,\phi_v,\psi_u,\psi_v,B)\cdot\exp(ikz-i\omega t) \quad (II.29)$$

Let us find common solutions to equations (II.1, II.2, II.4-II.6).

Let us consider set of equations (II.24, II.25) determining the evolution of the compressional waves in the saturated porous medium:

$$(\bar{a}_1+1)\Delta\phi_u - \bar{a}_2\Delta\phi_v + (1+\epsilon\bar{b}_\alpha)\phi_u - \epsilon\bar{b}_\alpha\phi_v = 0, \quad (II.30)$$

$$-\bar{a}_3\Delta\phi_u + \bar{a}_4\Delta\phi_v - \bar{b}_\alpha\phi_u + (1+\bar{b}_\alpha)\phi_v = 0, \quad (II.31)$$

Taking into account the form of the solution, set of equations (II.30-II.31) determining the evolution of the compressional waves may be written out in the matrix form:

$$A\Delta\Phi + W\Phi = 0. \quad (II.32)$$

Here $$A = \begin{pmatrix} \bar{a}_0 & -\bar{a}_2 \\ -\bar{a}_3 & \bar{a}_4 \end{pmatrix}$$

is the matrix of coefficients, $$\bar{a}_0 = \bar{a}_1 + 1, \quad W = \begin{pmatrix} (1+\epsilon\bar{b}_a) & -\epsilon\bar{b}_a \\ -\bar{b}_a & (1+\bar{b}_a) \end{pmatrix},$$

whereas the other coefficients are defined above; $\Phi = (\phi_u\ \phi_v)^T$ is the vector-column of functions.

We transform set of equations (II.32) via multiplying it by the matrix $W^{-1}$:

$$W^{-1} = \begin{pmatrix} \dfrac{1+\bar{b}_a}{\det W} & \dfrac{\epsilon\bar{b}_a}{\det W} \\ \dfrac{\bar{b}_a}{\det W} & \dfrac{1+\epsilon\bar{b}_a}{\det W} \end{pmatrix},$$

where $\det W = 1+(1+\epsilon)\bar{b}_\alpha$, and we arrive at the set of equations with the diagonal matrix in front of the free term:

$$H\Delta\Phi + \Phi = 0, \text{ where } H = W^{-1}A. \quad (II.33)$$

The components of the matrix H are:

$$h_{11} = ((1+\bar{b})\bar{a}_0 - \epsilon\bar{b}\bar{a}_3)/\det W, \quad h_{12} = (-(1+\bar{b})\bar{a}_2 + \epsilon\bar{b}\bar{a}_4)/\det W, \quad (II.34)$$

$$h_{21} = (\bar{b}\bar{a}_0 - (1+\epsilon\bar{b})\bar{a}_3)/\det W, \quad h_{22} = (-\bar{b}\bar{a}_2 + (1+\epsilon\bar{b})\bar{a}_4)/\det W, \quad (II.35)$$

Let us bring set of equations (II.33) obtained above to the diagonal form:

$$\Lambda\Delta\Omega + \Omega = 0, \text{ where} \quad (II.36)$$

$$\Lambda = \begin{pmatrix} \lambda_1 & 0 \\ 0 & \lambda_2 \end{pmatrix}, \quad \Omega = (\varphi_1\ \varphi_2)^T \quad (II.37)$$

using the transform matrix R $$R = \left(\begin{pmatrix} R_1 \\ R_3 \end{pmatrix}\begin{pmatrix} R_2 \\ R_4 \end{pmatrix}\right), \quad (II.38)$$

which is made of the right-hand side eigenvectors of the matrix A: $R^{-1}AR = \Lambda$. Here $$R_1 = 1,\ R_2 = (\lambda_2 - h_{22})/h_{21},\ R_3 = h_{21}/(\lambda_1 - h_{22}),\ R_4 = 1. \quad (II.39)$$

The column vector of these functions is transformed as follows:

$$R^{-1}\Phi = \Omega, \text{ where } \Omega = \begin{pmatrix} \varphi_1 \\ \varphi_2 \end{pmatrix} \quad (II.40)$$

The diagonal matrix $\Lambda = R^{-1}AR$ has eigenvalues $\lambda_1$ and $\lambda_2$ of the matrix A as its diagonal elements, which are determined as follows:

$$\lambda_1 = \tfrac{1}{2}\text{tr } H - \sqrt{\tfrac{1}{4}(\text{tr}H)^2 - \det H},\ \lambda_2 = \tfrac{1}{2}\text{tr } H + \sqrt{\tfrac{1}{4}(\text{tr}H)^2 - \det H}, \quad (II.41)$$

where tr $H = h_{11} + h_{22}$ is the trace of the matrix H, det $H = h_{11}h_{22} - h_{12}h_{21}$ is the determinant of the matrix H.

Thus, set of equations (II.30, II.31) in cylindrical coordinates is expressed in the diagonal form, (II.29)

$$\partial_r^2\varphi_1 + \frac{1}{r}\partial_r\varphi_1 + \frac{1}{\lambda_1}\varphi_1 + \partial_z^2\varphi_1 = 0, \quad (II.42)$$

$$\partial_r^2\varphi_2 + \frac{1}{r}\partial_r\varphi_2 + \frac{1}{\lambda_2}\varphi_2 + \partial_z^2\varphi_2 = 0, \quad (II.43)$$

or, taking into account the form of solution (II.29), $$\varphi_1'' + \frac{1}{r}\varphi_1' - l_1^2\varphi_1 = 0, \quad (II.44)$$

$$\varphi_2'' + \frac{1}{r}\varphi_2' - l_2^2\varphi_2 = 0, \quad (II.45)$$

where it is determined that $$l_1^2 = k^2 - \frac{1}{\lambda_1},\ l_2^2 = k^2 - \frac{1}{\lambda_2}.$$

The prime sign marks the derivative with respect to radius.

Solutions to equations (II.44, II.45) are expressed via the modified Bessel functions $K_0(l_i r)$, $I_0(l_i r)$ and, taking into account the boundedness of this solution in the infinity, they have the following form:

$$\phi_1 = C_1 K_0(l_1 r), \; \phi_2 = C_2 K_0(l_2 r) \qquad (\text{II}.46)$$

Here $C_1$, $C_2$ are integration constants.
The solution to set (II.44, II.45) and the solution to the original set (II.30, II.31) are related as in (II.40):

$$\Phi = R\Omega \qquad (\text{II}.47)$$

Or $$\phi_u = \phi_1 + R_2\phi_2, \qquad (\text{II}.48)$$

$$\phi_v = R_3\phi_1 + \phi_2. \qquad (\text{II}.49)$$

Thus, the solution for the potentials $\phi_u$, $\phi_v$ can be written out as follows:

$$\phi_u = C_1 K_0(l_1 r) + C_2 R_2 K_0(l_2 r), \; \phi_v = C_1 R_3 K_0(l_1 r) + C_2 K_0(l_2 r). \qquad (\text{II}.50)$$

Let us next consider the set of equations (II.26-II.28) determining the evolution of the shear waves:

$$\Delta_\phi \psi_u + (1 + \epsilon \bar{b}_\alpha) \psi_u - \epsilon \bar{b}_\alpha \psi_v - \epsilon \bar{b}_e B_\phi = 0, \qquad (\text{II}.51)$$

$$-\bar{b}_\alpha \psi_u + (1 + \bar{b}_\alpha) \psi_v + \bar{b}_e B_\phi = 0, \qquad (\text{II}.52)$$

$$i g \Delta_\phi B_\phi + i \Delta_\phi \psi_u - i \Delta_\phi \psi_v - B_\phi = 0. \qquad (\text{II}.53)$$

The second equation yields the following relationship between the potentials:

$$\psi_v = \bar{b}_\alpha \beta \psi_u - \bar{b}_e \beta B_\varphi, \text{ where } \beta = \frac{1}{1+\bar{b}_a}, \qquad (\text{II}.54)$$

which allows us to exclude $\psi_v$ from set (II.52):

$$\Delta_\phi \psi_u + \epsilon \bar{b}_\alpha \beta \psi_u - \epsilon \bar{b}_e \beta B_\phi = 0, \qquad (\text{II}.55)$$

$$i\beta \Delta_\phi \psi_u + i(g + \bar{b}_e \beta) \Delta_\phi B_\phi - B_\phi = 0. \qquad (\text{II}.56)$$

Taking into account the form of the solution, set of equations (II.55, II.56) determining the evolution of the compressional waves may be written out in the matrix form:

$$D\Delta_\phi \Psi + W\Psi = 0. \qquad (\text{II}.57)$$

Here $$D = \begin{pmatrix} 1 & 0 \\ i\beta & i(g + \bar{b}_e \beta) \end{pmatrix}$$

is the matrix of coefficients, $$W = \begin{pmatrix} \epsilon \bar{b}_a \beta & -\epsilon \bar{b}_e \beta \\ 0 & -1 \end{pmatrix},$$

while the other coefficients are defined above; $\Psi = (\psi_u \; B_\phi)^T$ is the vector-column of functions.

We transform set of equations (II.57) via multiplying it by the matrix $W^{-1}$:

$$W^{-1} = \begin{pmatrix} \dfrac{-1}{\det W} & \dfrac{\epsilon \bar{b}_e \beta}{\det W} \\ 0 & \dfrac{\epsilon \bar{b}_\alpha \beta}{\det W} \end{pmatrix},$$

where $\det W = -\epsilon \bar{b}_e \beta$, and we arrive at the set of equations with the diagonal matrix in front of the free term:

$$N\Delta_\phi \Psi + \Psi = 0, \text{ where } N = W^{-1} D. \qquad (\text{II}.58)$$

The components of the matrix N are:

$$n_{11} = (-1 + \epsilon \bar{b}_e \beta^2)/\det W, \; n_{12} = i\epsilon \bar{b}_e \beta(g + \bar{b}_e \beta)/\det W, \qquad (\text{II}.59)$$

$$n_{21} = i\epsilon \bar{b}_\alpha \beta^2/\det W, \; n_{22} = i\epsilon \bar{b}_\alpha \beta(g + \bar{b}_e \beta)/\det W. \qquad (\text{II}.60)$$

Let us bring set of equations (II.58) obtained above to the diagonal form:

$$\Lambda \Delta_\varphi \Omega + \Omega = 0, \text{ where} \qquad (\text{II}.61)$$

$$\Lambda = \begin{pmatrix} \lambda_3 & 0 \\ 0 & \lambda_4 \end{pmatrix}, \Omega = (\psi_1 \; \psi_2)^T \qquad (\text{II}.62)$$

using the transform matrix P $$P = \begin{pmatrix} P_1 & P_2 \\ P_3 & P_4 \end{pmatrix}, \qquad (\text{II}.63)$$

which is made of the right-hand side eigenvectors of the matrix D: $P^{-1}DP = \Lambda$. Here $$P_1 = 1, \; P_2 = (\lambda_4 - n_{22})/n_{21}, \; P_3 = n_{21}/(\lambda_3 - n_{22}), \; P_4 = 1. \qquad (\text{II}.64)$$

The column vector of these functions is transformed as follows:

$$P^{-1} \Psi = \Omega, \text{ where } \Omega = \begin{pmatrix} \psi_1 \\ \psi_2 \end{pmatrix}. \qquad (\text{II}.65)$$

The diagonal matrix $\Lambda = P^{-1}DP$ has eigenvalues $\lambda_3$ and $\lambda_4$ of the matrix A as its diagonal elements, which are determined as follows:

$$\lambda_3 = \tfrac{1}{2} \operatorname{tr} N - \sqrt{\tfrac{1}{4}(\operatorname{tr} N)^2 - \det N}, \; \lambda_4 = \tfrac{1}{2} \operatorname{tr} N + \sqrt{\tfrac{1}{4}(\operatorname{tr} N)^2 - \det N}, \qquad (\text{II}.66)$$

where $\operatorname{tr} N = n_{11} + n_{22}$, $\det N = n_{11} n_{22} - n_{12} n_{21}$.
Thus, set of equations (II.55, II.56) in cylindrical coordinates is expressed in the diagonal form, (II.61)

$$\partial_r^2 \psi_1 + \frac{1}{r}\partial_r \psi_1 - \frac{1}{r^2}\psi_1 + \frac{1}{\lambda_3}\psi_1 + \partial_z^2 \psi_1 = 0, \qquad (\text{II}.67)$$

$$\partial_r^2 \psi_2 + \frac{1}{r}\partial_r \psi_2 - \frac{1}{r^2}\psi_2 + \frac{1}{\lambda_4}\psi_2 + \partial_z^2 \psi_2 = 0, \qquad (\text{II}.68)$$

or, taking into account the form of its solution (II.29), set of equations (II.67, II.68) determining the evolution of the shear waves can be reduced to the following set of equations:

$$\psi_1'' + \frac{1}{r}\psi_1' - \left(l_3^2 + \frac{1}{r^2}\right)\psi_1 = 0, \qquad (II.69)$$

$$\psi_2'' + \frac{1}{r}\psi_2' - \left(l_4^2 + \frac{1}{r^2}\right)\psi_2 = 0, \qquad (II.70)$$

where it is determined that $$l_3^2 = k^2 - \frac{1}{\lambda_3}, \quad l_4^2 = k^2 - \frac{1}{\lambda_4}.$$

The prime sign marks the derivative with respect to radius. Solutions to equations (II.67, II.68) are expressed via the modified Bessel functions $K_1(l_1r)$, $I_1(l_1r)$ and, taking into account the boundedness of this solution in the infinity, they have the following form:

$$\psi_1 = C_3 K_1(l_3 r), \; \psi_2 = C_4 K_1(l_4 r). \qquad ((II.71)$$

Here $C_3$, $C_4$ are integration constants.
The solution to set (II.67, II.68) and the solution to the original set (II.55, II.56) are related as in (II.65):

$$\Psi = P\Omega \qquad (II.72)$$

Or $$\psi_u = \psi_1 + P_2 \psi_2, \qquad (II.73)$$

$$B_\phi = P_3 \psi_1 + \psi_2. \qquad (II.74)$$

The solution for the potentials $\psi_u$, $\psi_v$ and magnetic field $B_\phi$ are expressed via the solution for the potentials $\psi_1$, $\psi_2$:

$$\psi_u = C_3 K_1(l_3 r) + C_4 P_2 K_1(l_4 r), \qquad (II.75)$$

$$B_\phi = C_3 P_3 K_1(l_3 r) + C_4 K_1(l_4 r), \qquad (II.76)$$

$$\psi_v = C_3 \beta_3 K_0(l_3 r) + C_4 \beta_4 K_0(l_4 r), \qquad (II.77)$$

where $\beta_3 = (\bar{b}_\alpha - \bar{b}_e P_3)\beta$, $\beta_4 = (\bar{b}_\alpha P_2 - \bar{b}_e)\beta$.

Solutions (II.75, I.76, I.77) obtained above lead to expressions for velocities and time derivatives of the stress tensors. Due to the choice of geometry in this problem, velocity components can be expressed as follows:

$$u_r = \partial_r \varphi_u + \partial_z \psi_u, \quad u_z = \partial_z \varphi_u - \partial_r \psi_u - \frac{1}{r}\psi_u, \qquad (II.78)$$

$$v_r = \partial_r \varphi_v + \partial_z \psi_v, \quad v_z = \partial_z \varphi_v - \partial_r \psi_v - \frac{1}{r}\psi_v. \qquad (II.79)$$

Because, from (II.48, II.49, II.73, II.74):

$$\varphi_u = \varphi_1 + R_2 \varphi_2, \; \varphi_v = R_3 \varphi_1 + \varphi_2, \qquad (II.80)$$

$$\psi_u = \psi_1 + P_2 \psi_2, \; B_\phi = P_3 \psi_1 + \psi_2, \; \psi_v = \beta_3 \psi_1 + \beta_4 \psi_2, \qquad (II.81)$$

we have $$u_r = \partial_r \varphi_1 + R_2 \partial_r \varphi_2 + \partial_z \psi_1 + P_2 \partial_z \psi_2, \qquad (II.82)$$

$$u_z = \partial_z \varphi_1 + R_2 \partial_z \varphi_2 - \partial_r \psi_1 - P_2 \partial_r \psi_2 - \frac{1}{r}\psi_1 - \frac{1}{r}P_2 \psi_2, \qquad (II.83)$$

$$v_r = R_3 \partial_r \varphi_1 + \partial_r \varphi_2 + \beta_3 \partial_z \psi_u + \beta_4 \partial_z \beta_\varphi, \qquad (II.84)$$

$$v_z = R_3 \partial_z \varphi_1 + \partial_z \varphi_2 - \beta_3 \partial_r \psi_v - \beta_4 \partial_r \beta_\varphi - \frac{1}{r}\beta_3 \psi_u - \frac{1}{r_e}\beta_4 \beta_\varphi. \qquad (II.85)$$

In accordance to (II.50, II.75-I.77) and taking into account the recurrent relationships between the Bessel functions, we arrive at the final form of the solution to set of equations (II.16-II.18):

$$u_r = -C_1 l_1 K_1(l_1 r) - C_2 R_2 l_2 K_1(l_2 r) + ikC_3 K_1(l_3 r) + ikC_4 P_2 K_1(l_4 r), \qquad (II.86)$$

$$u_z = ikC_1 K_0(l_1 r) + ikC_2 R_2 K_0(l_2 r) + C_3 l_3 K_0(l_3 r) + C_4 P_2 l_4 K_0(l_4 r), \qquad (II.87)$$

$$v_r = -C_1 R_3 l_1 K_1(l_1 r) - C_2 l_2 K_1(l_2 r) + ikC_3 \beta_3 K_1(l_3 r) + ikC_4 \beta_4 K_1(l_4 r), \qquad (II.88)$$

$$v_z = ikC_1 R_3 K_0(l_1 r) + ikC_2 K_0(l_2 r) + C_3 \beta_3 l_4 K_0(l_4 r), \qquad (II.89)$$

$$B_\phi = C_3 P_3 K_1(l_3 r) + C_4 K_1(l_4 r) \qquad (II.90)$$

Let us next consider the equation determining the evolution of the borehole fluid. We can introduce potentials for the fluid velocity just as in the discussion above, via the following expression:

$$v = \nabla \phi_f - \text{rot } \psi_f \qquad (II.91)$$

which has the following components in the given geometry:

$$v_r = \partial_r \phi_f, \qquad (II.92)$$

$$v_z = \partial_z \phi_f, \qquad (II.93)$$

Then, in accordance to equation (II.13), we arrive at:

$$\lambda_0 \Delta \phi_f + \phi_f = 0. \qquad (II.94)$$

The solution to equation (II.94) for the borehole fluid is expressed via the modified Bessel functions $I_\alpha(z)$:

$$\varphi_v = C_5 I_0(l_0 r), \; l_0^2 = k^2 - \frac{1}{\lambda_0}. \qquad (II.95)$$

Here we take into account the fact that no singularity is found in the center of the borehole.
Let us next consider the equation determining the evolution of magnetic field in the borehole (II.14):

$$ig\Delta_\phi B_\phi - B_\phi = 0, \qquad (II.96)$$

The solution to equation (II.96) for the borehole fluid is expressed via the modified Bessel functions $I_\alpha(z)$:

$$B_\varphi = C_6 I_1(l_6 r), \; l_6^2 - \frac{i}{g}. \qquad (II.97)$$

Here we take into account the fact that no singularity is found in the center of the borehole. The solutions to equations (II.13, II.14) for the borehole are:

$$v_r = C_5 l_0 I_1(l_0 r), \qquad (II.98)$$

$$v_z = ikC_5 I_0(l_0 r), \qquad (II.99)$$

$$B_\phi = C_6 I_1(l_6 r). \qquad (II.100)$$

We arrive at the dispersive relationship for the wave vector k in accordance to the condition of solutions (II.86-II.90, II.98-II.100) satisfying the boundary conditions at the borehole boundary:

The continuity condition for the φ component of the magnetic field and z component of the electrical field:

$$B_\phi^{(1)} = B_\phi^{(0)} \quad (II.101)$$

$$E_z^{(1)} = E_z^{(0)} \quad (II.102)$$

The continuity condition for the normal mass flow:

$$(1-\phi)u_r^{(1)} + \phi v_r^{(1)} = v_r^{(0)} \quad (II.103)$$

The continuity condition for the components of the normal projection of the stress tensor $\Sigma_{ik}$ $$\Sigma_{rr}^{(1)} = \Sigma_{rr}^{(0)}, \quad (II.104)$$

$$\Sigma_{rz}^{(1)} = 0, \quad (II.105)$$

The equality condition for the components of the normal projection of the partial stress tensor of the saturating fluid $\Sigma_{rr}^{l(1)}$ and the borehole fluid $\Sigma_{rr}^{(0)}$ $$\Sigma_{rr}^{l(1)} = \phi \Sigma_{rr}^{(0)}. \quad (II.106)$$

The latter condition in terms of pressure takes the following form:

$$\frac{p^{(1)}}{\rho^{(1)}} - \kappa \frac{\rho^{(1)}}{\rho_s^{(1)}} \bar{b}(\varphi_u^{(1)} - \varphi_v^{(1)}) = \frac{p^{(0)}}{\rho^{(0)}}. \quad (II.107)$$

Here the coefficient κ is introduced because there is no reason to believe that the friction coefficient at the boundary has to coincide with the friction coefficient in the porous medium. Consequently, the continuity condition is satisfied for the time derivatives of the components of the normal projection of the elastic tensor:

$$\dot{\Sigma}_{rz}^{(1)} = 0, \; \dot{\Sigma}_{rr}^{(1)} = \dot{\Sigma}_{rr}^{(0)}, \; \dot{\Sigma}_{rr}^{l(1)} = \phi \dot{\Sigma}_{rr}^{(0)}. \quad (II.108)$$

Here $$-\dot{p}^{(1)} = \pi_1 \, \text{div} \, u^{(1)} + \pi_2 \, \text{div} \, v^{(1)}, \quad (II.109)$$

$$\dot{\Sigma}_{rr}^{(1)} = \pi_3 \, \text{div} \, u^{(1)} + \pi_4 \, \text{div} \, v^{(1)} + 2\partial_r u_r, \quad (II.110)$$

$$\dot{\Sigma}_{rz}^{(1)} = \partial_r u_z + \partial_z u_r, \quad (II.111)$$

$$\Sigma_{rr}^{(0)} = -\dot{p}^{(0)} = \pi_0 \text{div} v^{(0)}, \quad (II.112)$$

$$\pi_1 = \left(\frac{\rho_s}{\rho}\gamma - \frac{\rho_l}{\rho}K\right) / (\rho_s c_t^2), \; \pi_2 = \left(\frac{\rho_l}{\rho}\gamma + \frac{\rho_l}{\rho}K\right) / (\rho_s c_t^2), \quad (II.113)$$

$$\pi_3 = \left(\frac{\rho_s}{\rho}\gamma - \frac{2}{3}\mu\right) / (\rho_s c_t^2), \; \pi_4 = \left(\frac{\rho_l}{\rho}\gamma\right) / (\rho_s c_t^2), \quad (II.114)$$

$$\pi_0 = \rho^{(0)} c_{p0}^2 / (\rho_s c_t^2). \quad (II.115)$$

Substituting equations (II.93-II.100) into the boundary conditions (II.101-II.106), we can then present the boundary conditions in the matrix form:

$$G\Xi = 0. \quad (II.116)$$

where the vector-column of coefficients $\Xi = (C_1 \, C_2 \, \ldots \, C_5 \, C_6)^T$ and the matrix G with the components $$g_{11} = ((1-\phi) + R_3\phi)l_1 K_1(l_1 r_2), \quad (II.117)$$
$$g_{12} = ((1-\phi)R_2 + \phi)l_2 K_1(l_2 r_2),$$

$$g_{13} = -ik((1-\phi) + \beta_3 \phi)K_1(l_3 r_2), \quad (II.118)$$
$$g_{14} = -ik(\beta_4 \phi - (1-\phi)P_2)K_1(l_3 r_2),$$

$$g_{15} = -l_0 l_1(l_0, r_2), \; g_{16} = 0, \quad (II.119)$$

$$g_{21} = ((\pi_3 + \pi_4 R_3)(l_1^2 - k^2) + 2l_1^2)K_0(l_1 r_2) + 2l_1 K_1(l_1 r_2)/r_2, \quad (II.120)$$

$$g_{22} = ((\pi_3 R_2 + \pi_4)(l_2^2 - k^2) + 2R_2 l_2^2)K_0(l_2 r_2) + 2R_2 l_2 K_2(l_2 r_2)/r_2, \quad (II.121)$$

$$g_{23} = -2ik(l_3 K_0(l_3 r_2) + K_1(l_3 r_2)/r_2), \quad (II.122)$$

$$g_{24} = -2ikP_2(l_4 K_0(l_4 r_2) + K_1(l_4 r_2)/r_2), \quad (II.123)$$

$$g_{25} = -\pi_0(l_0^2 - k^2)I_0(l_0 r_2), \; g_{26} = 0, \quad (II.124)$$

$$g_{31} = 2ikl_1 K_1(l_1 r_2), \; g_{32} = 2ikR_2 l_2 K_1(l_2 r_2), \quad (II.125)$$

$$g_{33} = (l_3^2 + k^2)K_1(l_3 r_2), \; g_{34} = P_2(l_3^2 + k^2)K_1(l_3 r_2), \quad (II.126)$$

$$g_{35} = 0, \; g_{36} = 0, \quad (II.127)$$

$$g_{41} = \left((\pi_1 + R_3 \pi_2)(l_1^2 - k^2) - \bar{b}_\alpha \frac{\rho^{(1)}}{\rho_s^{(1)}}(1-R_3)\right)K_0(l_1 r_2), \quad (II.128)$$

$$g_{42} = \left((R_2 \pi_1 + \pi_2)(l_2^2 - k^2) - \bar{b}_\alpha \frac{\rho^{(1)}}{\rho_s^{(1)}}(R_2 - 1)\right)K_0(l_2 r_2), \quad (II.129)$$

$$g_{43} = 0, \; g_{44} = 0, \; g_{45} = -\frac{\rho^{(1)}}{\rho^{(0)}}\pi_0(l_0^2 - k^2)I_0(l_0 r_2), \; g_{46} = 0, \quad (II.130)$$

$$g_{51} = ik(1-R_3)K_0(l_1 r_2), \; g_{52} = ik(R_2 - 1)K_0(l_2 r_2), \quad (II.131)$$

$$g_{53} = (1 + gP_3 - \beta_3)l_3 K_0(l_3 r_2), \; g_{54} = (P_2 + g - \beta_4)l_4 K_0(l_4 r_2), \quad (II.132)$$

$$g_{55} = 0, \; g_{56} = gl_6 I_0(l_6 r_2), \quad (II.133)$$

$$g_{61} = 0, \; g_{62} = 0, \; g_{63} = P_3 K_1(l_3 r_2), \; g_{64} = K_1(l_4 r_2), \quad (II.134)$$

$$g_{65} = 0, \; g_{66} = -I_1(l_6 r_2). \quad (II.135)$$

The dispersive relationship which ties together the wave vector k and frequency ω, is found based on the fact that the matrix G determinant is nil:

$$\det G = 0 \quad (II.136)$$

Finding roots to this non-linear equation is performed numerically using the Mueller method. The oscillatory mode $k_{st}$ characterizing Stoneley wave is selected among the roots of a dispersive relationship. The velocity of the guided wave $v_{st}$, the attenuation length along the boundary $l_*$ and the attenuation coefficient $1/Q$ are determined by the following equations:

$$v_{st} = \omega(\text{Re}k_{st})^{-1}, \; l_* = (\text{Im}k_{st})^{-1}, \; \frac{1}{Q} = 2\frac{\text{Im}(k_{st})}{\text{Re}(k_{st})}. \quad (II.137)$$

In order to find the electroacoustic ratio (3) let us write out the solution for the z-component of electrical field in borehole (II.15) in dimensionless form, taking into account the solution for φ-component of magnetic field (II.100)

$$E_z = C_6 \frac{c_t}{c_e} gl_6 I_0(l_6 r). \quad (II.138)$$

where $$l_6^2 = k_{st}^2 - \frac{i}{g}.$$

The expression (II.138) and the solution for velocity of borehole fluid (II.99) lead to the electroacoustic ratio $$\frac{E_z}{v_z} = -i \frac{C_6 c_l g \sqrt{(k_{st}^2 - i/g)} \, I_0\left(r\sqrt{(k_{st}^2 - i/g)}\right)}{C_5 c_e k_{st} I_0\left(r\sqrt{k_{st}^2 - 1/\lambda_0}\right)}, \quad \text{(II.139)}$$

The constant of integration $C_6/C_6$ can be defined from set of equations (II.116).

The invention claimed is:

1. A method of evaluating an earth formation intersected by a borehole, the method comprising:
    using an acoustic transmitter to generate acoustic signals at a frequency producing a resonance of fluid wherein said resonance generates a velocity of the fluid in the borehole and a velocity of the formation at an interface between the fluid and the formation such that a difference between the velocity of the fluid in the borehole and the velocity of the formation is dependent upon permeability of the formation; and
    making a first measurement of the fluid velocity;
    making a second measurement of the velocity of the formation;
    making a third measurement indicative of an electric charge on a wall of the borehole taken at the frequency; and
    using a processor to estimate an electroacoustic constant of the earth formation using the first measurement, the second measurement, and the third measurement.

2. The method of claim 1 wherein the acoustic transmitter comprises a swept frequency source, and wherein using the acoustic transmitter further comprises using the swept frequency source in the borehole and identifying the frequency by identifying from a plurality of frequencies in a frequency sweep the frequency at which a corresponding difference between a corresponding fluid velocity in the borehole and a corresponding velocity of the formation is at a maximum.

3. The method of claim 2 further comprising using a geophone for measuring the velocity of the formation and using a flow rate sensor to measure the fluid velocity.

4. The method of claim 2 further comprising:
    making an additional first measurement of the fluid velocity and an additional second measurement of the velocity of the formation at at least one additional frequency different from the frequency; and
    using the additional first measurement and the additional second measurement to estimate a permeability of the earth formation.

5. The method of claim 4 further comprising using a measured value of a first compressional wave in the formation, a second compressional waves in the formation, and a shear velocity of the formation to estimate the permeability.

6. The method of claim 2 wherein using the swept frequency source further comprises using a monopole source.

7. The method of claim 2 further comprising conveying the swept frequency source into the borehole on a conveyance device selected from: (i) a wireline, and (ii) a drilling tubular.

8. The method of claim 1 wherein making the third measurement indicative of the electric charge further comprises at least one of (i) using a grounded ammeter, and (ii) making a measurement in a pilot hole in the borehole wall.

9. An apparatus configured to evaluate an earth formation intersected by a borehole, the apparatus comprising:
    a device including an acoustic transmitter configured to generate acoustic signals at a frequency producing a resonance of fluid wherein said resonance generates a velocity of the fluid in the borehole and a velocity of the formation at an interface between the fluid and the formation such that a difference between the velocity of the fluid in the borehole and the velocity of the formation is dependent upon permeability of the formation;
    a first sensor configured to make a first measurement of the fluid velocity;
    a second sensor configured to make a second measurement of the velocity of the formation;
    a third sensor configured to make a third measurement indicative of an electric charge on a wall of the borehole taken at the frequency; and
    a processor configured to estimate an electroacoustic constant of the earth formation using the first measurement, the second measurement, and the third measurement.

10. The apparatus of claim 9 wherein the acoustic transmitter comprises a swept frequency source; and
    wherein the processor is further configured to identify the frequency by identifying from a plurality of frequencies in a frequency sweep the frequency at which a corresponding difference between a corresponding fluid velocity in the borehole and a corresponding velocity of the formation is at a maximum.

11. The apparatus of claim 10 further comprising a geophone configured to measure the velocity of the formation and a flow rate sensor configured to measure the fluid velocity.

12. The apparatus of claim 10 wherein using the swept frequency source further comprises using a monopole source.

13. The apparatus of claim 10 further comprising a conveyance device configured to convey the swept frequency source into the borehole, the conveyance device being selected from: (i) a wireline, and (ii) a drilling tubular.

14. The apparatus of claim 9 wherein the third sensor is selected from: (i) a grounded ammeter, and (ii) a sensor in a pilot hole in the borehole wall.

15. The apparatus of claim 9 wherein the processor is further configured to estimate a permeability of the earth formation using an additional first measurement of the fluid velocity and an additional second measurement of the velocity of the formation at at least one additional frequency of the fluid different from the frequency.

16. The apparatus of claim 15 wherein the processor is further configured to use a measured value of a first compressional wave in the formation, a second compressional wave in the formation, and a shear velocity of the formation to estimate the permeability.

* * * * *